United States Patent

Laudadio

[15] 3,704,027
[45] Nov. 28, 1972

[54] SUSPENSION SYSTEM FOR MOTOR VEHICLES

[72] Inventor: Sanfrancisco Cayetano Roque Laudadio, Sadi Carnot 102, Wilde, Buenos Aires, Argentina

[22] Filed: Dec. 9, 1970

[21] Appl. No.: 96,437

[30] Foreign Application Priority Data

Jan. 8, 1970   Argentina..................226.306

[52] U.S. Cl. .............280/87 B, 280/6 H, 280/112 A
[51] Int. Cl. ..........................................B62d 37/00
[58] Field of Search.........280/112 A, 87 B, 6 H, 6.1, 280/6.11

[56] References Cited

UNITED STATES PATENTS

| 3,194,581 | 7/1965 | Brueder | 280/112 A |
| 2,609,884 | 9/1952 | Camba | 280/112 A X |
| 3,020,062 | 2/1962 | Reed | 280/112 A |
| 2,855,214 | 10/1958 | Boulet | 280/112 A X |
| 2,641,480 | 6/1953 | Bancroft | 280/87 B |
| 2,950,124 | 8/1960 | Pribonic | 280/112 A |

FOREIGN PATENTS OR APPLICATIONS 410,056   3/1945   Italy......................280/112 A

*Primary Examiner*—Robert J. Spar
*Attorney*—Harness, Dickey & Pierce

[57] ABSTRACT

A motor vehicle suspension system that improves the cornering of the vehicle and reduces the tendency for the vehicle to roll over when rounding sharp curves. Lifting devices are interposed between each of the vehicle wheels and the vehicle body. A device responsive to the vehicular steering system actuates the outboard lifting devices when the vehicle is steered into a curve for combating the centrifugal forces that tend to shift the vehicle center of gravity.

2 Claims, 4 Drawing Figures

PATENTED NOV 28 1972 3,704,027

INVENTOR
Sanfrancisco C.R. Laudadio.

BY Harness, Dickey & Pierce
ATTORNEYS

SUSPENSION SYSTEM FOR MOTOR VEHICLES

BACKGROUND OF THE INVENTION

This invention relates to a suspension system for a motor vehicle and more particularly to a suspension system that improves the vehicle's cornering characteristics and prevents overturning. This system is particularly adapted for use in sports and racing cars.

It is well known that when a vehicle rounds a curve, particularly sharp, unbanked curves, that the centrifugal force tends to compress the outboard springs of the vehicle and causes a characteristic known as "lean." This leaning tendency shifts the center of gravity of the vehicle and reduces the speed at which the curve may be taken and, in extreme cases, can cause the vehicle to roll over.

It is, therefore, a principle object of this invention to provide a device that reduces the leaning tendencies of a vehicle when rounding curves.

It is another object of the invention to provide a steering responsive device for preventing leaning when a motor vehicle rounds a corner and for improving the vehicle cornering characteristics.

It is a further object of the invention to provide an improved, simplified steering operated device for preventing vehicular body lean.

SUMMARY OF THE INVENTION

This invention is adapted to be embodied in an improved suspension system for a motor vehicle having a body, a plurality of wheels at least two of which are disposed on opposite sides of the longitudinal center line of the vehicle, suspension means for supporting the wheels and body for relative movement and steering means for steering at least one of the wheels. The improved suspension system includes first and second lifting means operatively interposed between a respective one of the oppositely disposed wheels and the body for lifting the respective sides of the body relative to the wheels when actuated. Means responsive to the actuation of the steering means are provided for actuating the outermost of the lifting means upon the steering of the steered wheel in one direction for banking the vehicle into the turn.

DETAILED DESCRIPTION OF THE PREFERRED EMBODIMENT

Figure 1:
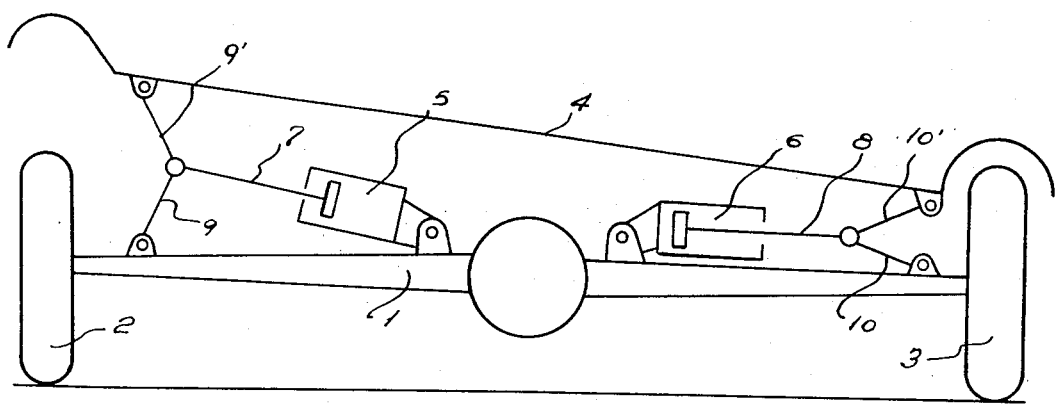
FIG. 1 is a schematic elevational view showing the rear axle and associated components in a motor vehicle embodying this invention and illustrating the system in one operative position.

In the drawings the components that form no portion of the invention have been illustrated either schematically or have not been shown so as to make the understanding of the invention more clear. Referring first to FIG. 1, which shows the rear suspension, the rear axle housing of a motor vehicle embodying this invention has been identified by the reference numeral 1. Wheels 2 and 3 are disposed at the outboard ends of axle shafts (not shown) contained within the axle housing 1. A rear suspension system (not shown) which may be of any known type operatively suspends a body or frame 4 for movement relative to the wheels 2 and 3.

Lifting devices in the form of hydraulically actuated cylinder assemblies 5 and 6 are operatively interposed between the wheels 2 and 3, respectively, and the frame 4. Each of the hydraulic cylinder assemblies 5 and 6 is positioned on a respective side of the longitudinal center line of the vehicle and is pivotally supported upon the axle housing 1 by means of a trunnion arrangement. The cylinder assembly 5 includes a piston and piston rod 7 that is pivotally connected at its outer end to a pair of toggle links 9 and 9'. The opposite ends of the toggle links 9 and 9' are pivotally connected to the axle housing 1 and frame 4 adjacent the wheel 2.

In a like manner, the cylinder assembly 6 includes a piston and piston rod 8 that are pivotally connected to one end of a pair of toggle links 10 and 10'. The toggle links 10 and 10' are pivotally connected at their respective opposite ends to the axle housing 1 and frame 4 adjacent the wheel 3.

Figure 2:
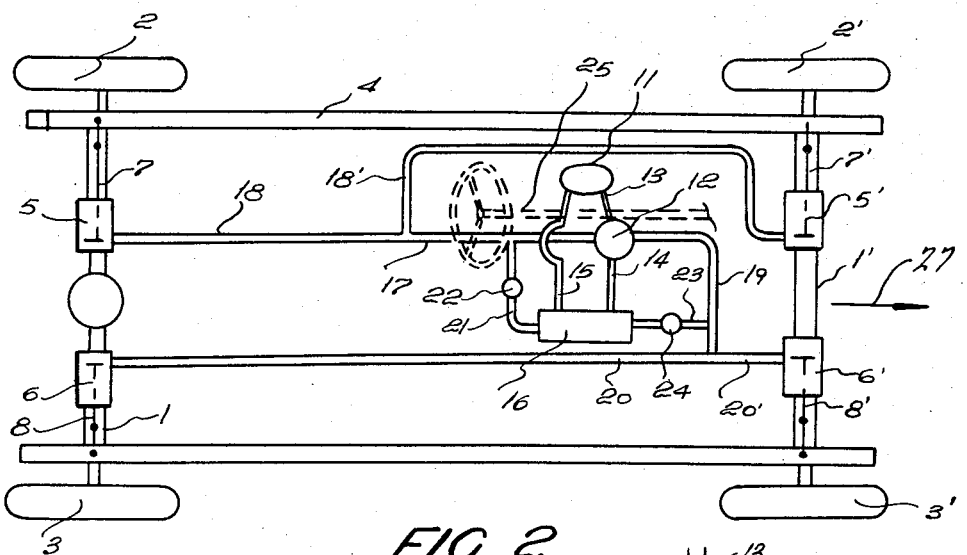
FIG. 2 is a schematic top plan view of the vehicle.

Referring now to FIG. 2 the vehicle also includes front wheels 2' and 3' that are carried at opposite ends of a front axle assembly 1'. The frame or body 4 is suspended upon the front axle assembly 1' by means of a suspension system (not shown) which may be of any known type. Lifting devices in the form of hydraulically operated cylinder assemblies 5' and 6' have piston and piston rods 7' and 8', respectively, that are interposed between the wheels 2' and 3' and the frame 4 and are operatively connected thereto in the same manner as the corresponding connections in the rear suspension. Because of this, the specific construction for accomplishing this connection will not be described in detail.

A fluid pump, indicated schematically at 11, discharges fluid to a selector valve 12 via a conduit 13. When in its center position (FIG. 3) the selector valve 12 discharges the pumped fluid through a conduit 14 back to a reservoir 16. The pump 11 draws the fluid from the reservoir 16 through a conduit 15. The selector valve 12 is also adapted, in a manner which will become more apparent as this description proceeds, to deliver fluid under pressure selectively to the cylinder assemblies 5 and 5' through conduits 17, 18 and 18' or to the cylinder assemblies 6 and 6' through conduits 19, 20 and 20'. The conduit 17 is interconnected with the reservoir 16 by means of a return conduit 21 in which a pressure responsive relief valve 22 is interposed. A conduit 23 in which a pressure responsive relief valve 24 is interposed interconnects the conduit 19 with the reservoir 16.

The front wheels 2' and 3' of the vehicle are dirigible and their steering is controlled by any known type of steering mechanism including an operator controlled steering wheel and steering shaft 25. The steering shaft 25 is connected to a rotatable control element 26 of the selector valve 12 (FIGS. 3 and 4).

OPERATION

Figure 3:
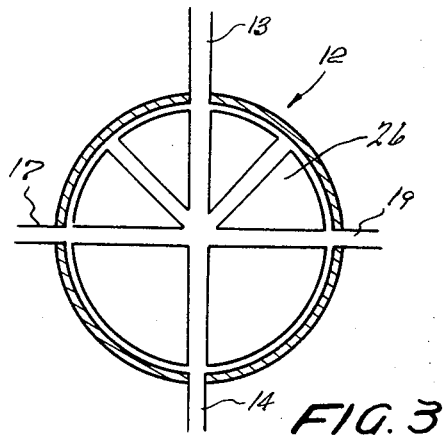
FIG. 3 is a cross-sectional view of the valve that actuates the lifting devices and shows the valve in a centered position.
Figure 4:
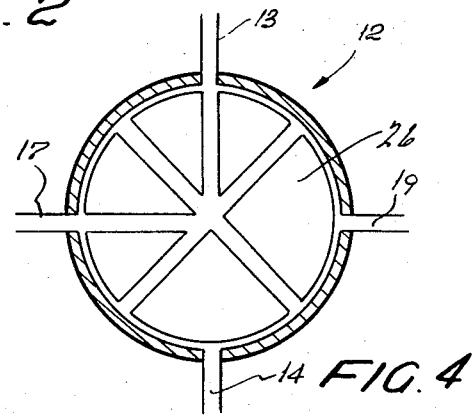
FIG. 4 is a cross-sectional view, in part similar to FIG. 3, and shows the valve in a first operative position.

FIGS. 2 and 3 illustrate the vehicle as it appears when traveling in a straight ahead direction as indicated by the arrow 27 in FIG. 2. In this condition, the control element 26 of the selector valve 12 provides for direct communication of the output side of the pump 11 with the reservoir 16. In addition, the conduits 17 and 19 may directly communicate with the reservoir 16 and the cylinder assemblies 5, 5', 6 and 6' will not be actuated.

When the steering shaft 25 is turned so as to direct the vehicle through a corner by steering of the front wheels 2' and 3' the control element 26 will rotate. After sufficient rotation has occurred, the high pressure conduit 13 will be placed in communication with one of the conduits 17 or 19, depending upon which direction the vehicle is being turned. Assuming that a right turn is being negotiated, the control element 26 places the high pressure conduit 13 in communication with the conduit 17 (FIG. 4). Under this condition, fluid under pressure is transmitted through the conduits 18 and 18' to the rear and front cylinder assemblies 5 and 5' on the left side of the longitudinal center line of the vehicle. Pressurization of the cylinder assemblies 5 and 5' urges their piston and piston rods 7 and 7' outwardly and cause the toggle links 9 and 9' to pivot and exert a lifting force on the left side of the vehicle frame 4 (FIG. 1). This, in effect, banks the body of the vehicle into the turn and counteracts the centrifugal forces that tend to shift the vehicle center of gravity to the left and compress the suspension system at the left-hand side of the vehicle. When the lifting force is exerted, excess pressure on the cylinder assemblies 5 and 5' will be relieved through the conduit 21 and relief valve 22.

When the wheels 2' and 3' are returned to a straight ahead position, the control valve element 26 will return to the position shown in FIG. 3. The weight of the vehicle acting upon the cylinder assemblies 5 and 5' through the toggle link 9 and 9' will drive the piston and piston rods 7 and 7' inwardly since they are no longer pressurized. Fluid will be expelled from the cylinder assemblies 5 and 5' through the conduits 18, 18' and 17. The operation when negotiating a left-hand turn is the same, but in this instance the right-hand cylinder assemblies 6 and 6' will be actuated in a manner which is believed to be apparent. Thus, it will be observed that when rounding a turn in either direction the outboard side of the vehicle is lifted by the respective lifting devices to improve the cornering characteristics of the vehicle and to reduce the likelihood of the vehicle rolling over.

The disclosed system may be conveniently fitted to vehicles having different weights by adjusting the pressures at which the relief valves 22 and 24 open. Also, adjustment of these valves will produce the desired lifting force for a given vehicle. The valve element 26 may also be designed so as to produce the lifting action at the desired degree of turning of the front wheels 2' and 3' by suitably positioning its ports or by changing the ratio of its connection with the steering shaft 25.

It is to be understood that the foregoing description is that of a preferred embodiment of the invention and that various changes and modifications from the described embodiment may be made without departing from the spirit and scope as defined by the appended claims.

What is claimed is:

1. An improved suspension system for a motor vehicle having a body, pairs of wheels disposed on respective opposite sides of a longitudinal center line of a vehicle, suspension means for resiliently supporting said wheels and said body for relative movement, steering means for steering the forwardmost wheels of the pairs, lifting means interposed between each of said wheels and said body, said lifting means comprising a hydraulic cylinder normally disposed in a horizontal direction, means for pivotally supporting said hydraulic cylinder, a pair of toggle links, said cylinder assembly being operatively connected to the knee of said toggle links, the first of said toggle links being operatively pivotally connected to the respective wheel, and the other of the toggle links being operatively pivotally connected to the body for lifting of the body relative to the respective wheel upon actuation of the respective cylinder assembly, a pump for supplying fluid under pressure, and means responsive to the actuation of said steering means for actuating the cylinders associated with the pair of wheels on the outboard side of said vehicle upon steering of said vehicle in one direction for banking said vehicle into the turn.

2. An improved suspension system as set forth in claim 1 further including an adjustable relief valve in the outboard circuit of the pump for determining the amount of lift exerted by the hydraulic cylinder assemblies.

* * * * *